United States Patent Office 3,784,487
Patented Jan. 8, 1974

3,784,487
PROCESS FOR MAKING A FOAM FROM A COMPOSITION COMPRISING BITUMINOUS MASSES, A NOVOLAC, AND HEXAMETHYL-ENETETRAMINE
Heinz-Gerhard Franck and Walter Metzendorf, Duisburg-Meiderich, and Erich Schweym, Herbert Beneke, Rolf Marrett, Jozef Nijssen, and Jaafar Omran, Castrop-Rauxel, Germany, assignors to Rutgerswerke Aktiengesellschaft, Frankfurt am Main, Germany
No Drawing. Continuation of abandoned application Ser. No. 885,308, Dec. 15, 1969. This application Apr. 5, 1972, Ser. No. 241,397
Int. Cl. C08j 1/14
U.S. Cl. 260—2.5 F                28 Claims

ABSTRACT OF THE DISCLOSURE

Foam materials of cellular structure are prepared from mixtures of bituminous materials with novolak by expanding and hardening said mixtures in molten condition by crosslinking and propelling. The molten mixture is preferably expanded and hardened by the incorporation therein of hexamethylenetetramine which acts as a crosslinking as well as hardening and propelling agent. The resulting inexpensive materials of cellular structure have satisfactory isolating characteristics, good mechanical resistivity, high resistance to temperature changes, considerable chemical stability and are not inflammable.

The foaming and hardening process according to the invention can be favorably influenced by subjecting the molten mixture of bituminous materials and novolak to a short pretreatment consisting of adding thereto a small amount of hexamethylenetetramine at about 150°–160° C.

CROSS REFERENCE TO RELATED APPLICATION

This application is a continuation of our copending application Ser. No. 885,308 filed Dec. 15, 1969, and now abandoned.

BACKGROUND OF THE INVENTION

In heat insulation, as well as insulation from cold, and in sound insulation, solid foams, i.e., cellular materials of low bulk density have been needed in increasing amounts. The requirements to be met by said materials depend on the intended use, for example, isolation of living rooms in order to prevent loss of heat, to render rooms soundproof, isolation of cold-storage rooms and tubings for steam etc. Usually materials have been needed which have high insulating power coupled with satisfactory mechanical stability, high resistance to pressure, high capacity of retaining shape, satisfactory resistance to heat, low absorption of steam and low permeability of steam.

The commercially available foam materials of low bulk density are generally prepared from artificial resins, for example, polystyrene, polyurethane, epoxide resins, silicones and phenol resins. In general, they have some excellent characteristics, but naturally they are relatively expensive. The cheaper foam materials of this group are not sufficiently satisfactory in their thermal stability and mechanical resistivity.

Attempts to prepare useful foams from bituminous materials, such as the residues obtained in processing tar or petroleum (i.e. pitch and bitumen) have been unsuccessful up to date. Due to the plastic properties of the starting materials, solid foams prepared from bituminous substances have no sufficient stability of shape at temperatures higher than a specific limit, and, moreover, they are, in general, relatively brittle.

The main object of the present invention is the production of inexpensive foam materials of cellular structure, which are resistant to pressure, retain their shape and are resistant to heat and chemicals, by a novel process.

SUMMARY OF THE INVENTION

It has been discovered that said object can be attained by reacting the mixture of bituminous mass with a novolak at a temperature in the range of 150–210° C., said mixture having a viscosity of 50–5000 centipoise at 150–210° C. and containing no free acid.

This reaction can be carried out in the following manner:

A mixture of bituminous mass with a novolak is foamed and hardened simultaneously at a temperature in the range of 150–210° C., said mixture having a viscosity of 50 to 5000 centipoise and containing no free acid, by the action of gases set free in the hardening process or by a known added propellant. The process of foaming and hardening is preferably carried out at a temperature in the range of 170–190° C. and a viscosity of 100 to 1000 centipoise.

According to the invention, the conditions for a favorable foaming and hardening process—viscosity of 50 to 5000 centipoise at 150 to 210° C. and absence of free acid—can be adjusted by a short thermal pre-treatment at 280 to 350° C., or by the addition of tar bases having a boiling range of 160 to 190° C., to the mixture of bituminous mass, novolak and, if desired, of modifying agents.

As bituminous masses, natural asphalt, petroleum bitumen, or preferably coal tar, lignite tar, wood tar, are used in carrying out the invention. Especially preferred are coal tar pitch, lignite tar pitch, wood tar pitch, petroleum bitumen rich in aromatic ingredients or mixtures thereof, in proportion of 50 to 80% by weight, preferably 65 to 75% by weight, said proportions being calculated on the weight of the bituminous mass-novolak mixtures. In carrying out the present invention pitches having a softening point of 30–120° C. according to Kramer-Sarnow, are used. Coal tar pitches having a softening point of 60–85° C. according to Kramer-Sarnow are preferred.

The novolak resins used in carrying out this invention are based on phenol, cresols, xylenols and used in a proportion of 20–50%, preferably 25–35%, by weight, calculated on the weight of the bituminous mass-novolak mixture. The novolaks used according to this invention have softening points according to Kramer-Sarnow of 70–110° C., and they are used in combination with a cross-linking agent for novolak and with a propellant, preferably hexamethylenetetramine which acts as a cross-linking as well as propelling agent.

Foaming of the mixtures, which is brought about automatically by the gases set free in the hardening process with hexamethylenetetramine, but may be caused also by addition of propellants, e.g., azo-compounds, urea, or the like, may be additionally supported by introduction or blowing in of finely distributed steam or gases.

The mechanical properties of the foam materials may be improved, if desired, by a thermal after-treatment at 200–300° C., during several hours.

The mixtures to be foamed may be mixed with filling materials, such as talcum, asbestos, carbon black, or the like, or modified with polyethylene, polyvinylchloride, polystyrene or similar materials.

The cellular structure can be influenced by the addition of stabilizers, emulsifying agents and wetting agents.

It has been found that by the process of the present invention foam materials are obtained, which are distinguished by satisfactory isolating characteristics, good mechanical resistivity, extraordinarily high resistance to temperature changes up to 350° C. The materials prepared according to the invention, possess valuable chemical stability and are inflammable.

In carrying out the invention with expansion in the absence of excess pressure, foam materials having extensively open pores are obtained, while carrying out the process under excess pressure, i.e., in a closed vessel, foamed materials having preponderantly closed pores, are formed.

It has been suggested previously to prepare solid foam materials from mixtures of bituminous masses with thermoplastic synthetic resins (see French Pat. No. 1,065,-257), but foam materials prepared in this manner exhibit, of course, a very limited resistance to heat. Said French Pat. 1,065,257 contains—on page 2, right column, lines 2–3—a brief general hint according to which in said known suggestion, instead of the claimed thermoplastic synthetic resins, heat-hardenable resins may also be used. However, in comparison with the simple procedure of the present invention, the process of the French patent appears to be decidedly troublesome.

According to the French Pat. 1,065,257 the bituminous masses and, if necessary, the resin, too, are pulverized and mixed in solid condition—after addition of a plasticizer and a foaming agent—to a paste which is poured into molds. The material introduced into the molds is then converted by heat treatment under pressure and subsequent cooling into a product, which—due to its plasticity—can be caused to expand at increased temperature by slow and cautious heating during an extended period of time. Thereby expansion is brought about by the action of gas which is set free from the foaming agent and causes slow expansion of the softening mass. The foaming process is extraordinarily protracted and requires several days.

In contrast to said process of the French patent, mixing of the bituminous mass with the novolak takes place in liquid condition. Foaming and hardening proceed parallel so that after termination of the expansion, the product has chemical and physical characteristics which are entirely different from its characteristics prior to the expansion process. Surprisingly, said characteristics after the expansion are much more favorable than those which could be expected by a person skilled in the pertinent art, in the case of a combination of both components in view of the known properties of phenol resin foam on the one hand and foam materials from bituminous masses on the other hand. In the journal "Product Engineering" of June 21, 1965, pp. 59–68, the publication "How to Evaluate the Rigid Plastic Foams" by H. Gerstin, describes the extreme brittleness, the low resistance to pressure and the tendency of phenol resin foams to corrode metals (l.c. p. 60, middle column, lines 2–6). Thus, alhough the French patent hints at preparation of foam materials from bituminous masses and heat-hardenable resins, it is evident from the above-cited publication in "Product Engineering" that it was not only not obvious to use as a thermosetting resin a phenol resin, but the use of thermosetting resins for this purpose was clearly counter-indicated.

As mentioned above, prior art foam materials made of bituminous masses have not been found useful at all.

In contrast hereto, foam materials prepared according to the present invention are not brittle at all; they are resistant to pressure and do not corrode metals, because they contain no free acid. Moreover, the fact that foam materials, prepared according to the present invention, are not at all inferior to phenol resin foam, is suprising, because it is known that foam materials prepared from bituminous masses show very low resistance to heat.

The decisive advantages of the process according to the present invention consist particularly in the chemical change of the mixture to be foamed, consisting of bituminous mass and novolak and in the expansion process which is extremely simple and takes a few minutes only.

According to a further embodiment of the present invention, the conditions for a favorable course of the foaming and hardening process may be beneficially influenced or adjusted by a short pre-treatment—lasting preferably 15–30 minutes—of the mixture of bituminous mass with novolak and, if desired—modifying agents, with about 0.1–0.3 part by weight of hexamethylenetetramine to 100 parts by weight of the mixture of bituminous mass novolak, at a temperature of about 150–160° C.

The following examples describe some preferred embodiments of the invention, to which the invention is not limited. The parts stated in the examples are by weight, if not otherwise stated.

Example 1

400 parts of a novolak having a softening point of 75° C. ks and 600 parts of coal tar pitch having a softening point of 70° C., are melted at 150° C. and the mixture is stirred until homogeneity is attained. Subsequently, 100 parts of tar bases having a boiling range of 160–190° C. are added and the temperature is increased to 180° C. The mixture has then a viscosity of 150 centipoise.

To the mixture thus obtained 50 parts of hexamethylenetetramine are added under vigorous stirring. After about 10 seconds, foaming sets in and it is terminated after 30 seconds. The foamed material is permitted to cool and has then a bulk density of 120 kg./m.$^3$. If desired, foaming can be followed by a thermal after-treatment at 300° C. during several hours.

The foam material thus prepared has a resistance to heat of 350° C., a compression strength of 46 kg./cm.$^2$ and a thermal conductivity of 0.04 kcal./mh. ° C.

Example 2

300 parts of a novolak having a softening point of 90° C. ks. and 700 parts of coal tar pitch having a softening point of 95° C. ks. are heated to 300° C. and cooled to 190° C. under stirring. The mixture has then a viscosity of 950 centipoise and contains no free acid.

To this mixture under stirring a mixture of 50 parts of hexamethylenetetramine with 20 parts of carbon black are added. After 35 to 40 seconds, foaming sets in so that sufficient time is left for pouring the mixture into molds.

The foam material has a bulk density of 180 kg./m.$^3$ and resistance to heat of 320° C. It has a compression strength of 28 kg./cm.$^2$ and a thermal conductivity of 0.045 kcal./mh. ° C.

Example 3

50 parts of hexamethylenetetramine are heated under stirring with 350 parts of coal tar pitch having a softening point of 80° C. ks. and with 30 parts of polystyrene, to 150° C. In another vessel 300 parts of a novolak having a softening point of 100° C. ks. and 350 parts of the same coal tar pitch are stirred at 350° C. for 5 minutes and subsequently cooled to 250° C., the two mixtures are then united, and the resulting mix has then a viscosity of 530 centipoise and contains no free acid.

Foaming starts after 20 seconds and is terminated after about 40 seconds. The foam material thus obtained has a bulk density of 210 kg./m.$^3$, a resistance to heat of 300° C. It has a compression strength of 41 kg./cm.$^3$.

Example 4

500 parts of a novolak having a softening point of 75° C. ks. and a mixture consisting of 300 parts of coal tar pitch having a softening point of 70° C. ks. and 200 parts of bitumen 85/25 are melted together at 150° C. and the mixture is stirred until homgeneity is attained. 100 parts of tar bases having a boiling range of 160 to 190° C. are then added. Subsequently, the temperature is increased to 175° C. and the mixture has then a viscosity of 310 centipoise.

To the resulting mixture 50 parts of hexamethylenetetramine are added under vigorous stirring. After about 10 seconds foaming sets in and it is terminated after about 30 seconds. The foam material has a bulk weight of 172 kg./m.³. After a thermal after-treatment at 300° C. the foam material has a resistance to heat of 325° C.

Example 5

300 parts of a novolak having a softening point of 110° C. ks. are mixed with 700 parts of coal tar. 50 parts of polyvinylchloride are added to the mixture under stirring and heating to 174° C. Stirring is continued for about 1 hour. Subsequently, 50 parts of hexamethylenetetramine suspended in 100 parts of tar bases having a boiling range of 160–190° C. are added. The mixture has a viscosity of 120 centipoise. After 30 seconds foaming is terminated.

The resulting foam material has a bulk weight of 105 kg./m.³. After a thermal after-treatment at 300° C., the foam material has a heat resistance of 310° C.

Example 6

300 parts of a novolak having a softening point of 75° C. ks. and 700 parts of lignite tar pitch having a softening point of 55° C. ks. are melted down at 150° C. and the mixture is stirred until homogeneity is attained. Subsequently 100 parts of tar bases having a boiling range of 160–190° C. are added. The temperature is then raised to 180° C. The mixture has a viscosity of 110 centipoise then.

Into the mixture 50 parts of hexamethylenetetramine is introduced under vigorous stirring. Foaming is terminated after 30 seconds.

The foam material has a bulk weight of 150 kg./m.³.

Example 7

300 parts of novolak having a softening point of 85° C. and 700 parts of coal tar pitch having a softening point of 70° C. ks. are mixed with 2.0 parts hexamethylenetetramine at 150° C. and stirred at this temperature during 15 minutes. Subsequently, the mixture is heated to 185° C. and foaming of the mass is brought about by the addition of 50 parts hexamethylenetetramine. The hardened finished foam product has a bulk weight of 170 kg./m.³. It has a resistance to heat of 300° C. and a compression strength of 27 kg./cm.².

Example 8

400 parts of novolak having a softening point of 92° C. ks. and 600 parts of coal tar pitch having a softening point of 51° C. ks., are mixed with 3.0 parts hexamethylenetetramine at 160° C. and are stirred at this temperature during 15 minutes. Subsequently, the mixture is heated to 185° C. and foaming of the mass is brought about by the addition of 50 parts of hexamethylenetetramine.

The hardened foam material has a bulk weight of 150 kg./m.³. It has a resistance to heat of 300° C. and a compression strength of 36 kg./cm.².

Example 9

350 parts of novolak having a softening point of 78° C. and 500 parts of coal tar pitch having a softening point of 60° C. ks. and 150 parts of lignite tar pitch having a softening point of 55° C. ks. are mixed with 2.5 parts of hexamethylenetetramine at 150° C. and are stirred at this temperature during 15 minutes. Subsequently, the mixture is heated to 190° C. and foaming of the mass is brought about by addition of 50 parts of hexamethylenetetramine.

The resulting foam material has a bulk weight of 175 kg./m.³. It has a resistance to heat of 30° C. and a compression strength of 29 kg./cm.².

The term "foam material" is used herein to denote materials of cellular structure, obtained by expanding and hardening mixtures of bituminous materials with novolak. The term "tar bases" is used to denote organic bases which can be found in and recovered from coal tar and other tars and consist of nitrogeneous organic bases and their derivatives. The "modifying agents" are used in the present invention in order to modify certain characteristics of the foam materials. For example, the addition of polyethylene, polystyrene and/or polyvinylchloride affects the pore structure of the foam and improves its elastic properties. The short pre-treatment with 1–3 parts hexamethylenetetramine described in the above examples 7–9 has the effect of a pre-condensation of the pitch novolak mixture. Thereby the viscosity of the mixture can be adjusted to a value suitable for the foaming and hardening operation. Moreover, it becomes thus possible to carry out the foaming step itself and the residual hardening of the foamed mixture with a reduced amount of the residual hexamethylenetetramine. This residual amount of hexamethylenetetramine must be measured in such manner that upon its decomposition to formaldehyde and $NH_3$ at least an amount of $NH_3$ is set free which is sufficient for effecting the desired expansion of volume. It will be appreciated that hexamethylenetetramine is decomposed at foaming temperature and sets free formaldehyde, which is a hardening agent for the mixture, and $NH_3$ in a sufficient amount to act as a propellant. In using an aqueous formaldehyde solution, the $CH_2O$ reacts with novolak and the water of the solution acts as a propellant. Stabilizers, emulsifiers and wetting agents have an effect on the surface tension of the mixture and have, therefore, an influence on the pore structure of the foam. The novolaks described in the above examples are preferably based on phenol or cresols. The viscosity values stated herein were measured by a rotation viscosimeter, described e.g. in Houben-Weyl: Methoden der Organischen Chemie, 4th edition, Part 1.—Physical methods (1955), page 436. The thermal after-treatment described in the above Example 1, takes about ½ to 3 hours. In the abbreviation "kcal./mh. ° C.," kcal. stands for kilogram calory, m stands for meter, h stands for hour and ° C. for Celsius degree. As described in the above Example 2, the mixture to be foamed is poured into molds. Thereby the mold is only partially filled with an amount of the mixture to be foamed, which corresponds to the desired bulk density of the expanded cake in the mold. The molds used may be either open molds or closed molds, in which foaming takes place under increased pressure. Foamed bodies formed in closed molds possess higher strength values than those formed in open molds under otherwise equal conditions. The Kramer-Sarnow method for determining the softening point is described in DIN–1995, and the abbreviation "DIN" stands for Deutsche Industrie-Normen, i.e., German industrial standards.

The parts and percent herein are by weight if not otherwise stated.

The embodiments of the invention in which an exclusive property or privilege is claimed are defined as follows:

1. Process for preparing insulation foam materials resistant to pressure and heat comprising the steps of,
   mixing in fluid condition a bituminous mass with novolak,
   heating the resulting mixture at a temperature in the range of 150 to 210° C.,
   treating at least one component of said mixture to produce a viscosity of 50 to 5000 centipoises and to achieve the essentially complete absence of free acid in said mixture at said temperature,
   incorporating into said mixture at said temperature and viscosity and in the absence of free acid hexamethylenetetramine as a source of cross linking agent and propellant,
   the bituminous mass, novolak, and hexamethylene tetramine being present in proportions of 500–700, 500–300, 50, respective weight parts,
   and foaming and hardening said mixture by formaldehyde, ammonia and water set free by decomposition of said hexamethylenetetramine under said temperature, viscosity and absence of free acid conditions.

2. Process in accordance with claim 1 wherein, the bitmuminous mass is selected from the group consisting of natural asphalt, petroleum, bitumen coal tar, lignite tar, wood tar, coal tar pitch, lignite tar pitch, wood tar pitch and petroleum bitumen rich in aromatic components.

3. Process in accordance with claim 1 wherein, the said foaming and hardening step is carried out at a temperature in the range of 170–190° C.

4. Process in accordance with claim 1 wherein, the bituminous mass comprises 50–80% by weight of the bituminous mass novolak mixture.

5. Process in accordance with claim 4 wherein, the bituminous mass comprises 65–75% of the mixture.

6. Process in accordance with claim 1 wherein, a pitch having a softening point of 30–120° C., as measured according to the method of Kramer-Sarnow, is used as the bituminous mass.

7. Process in accordance with claim 6 wherein, a coal tar pitch having a softening point of 60–85° C. is used.

8. Process in accordance with claim 1 wherein, said novolak is a derivative of a compound selected from the group consisting of phenol, cresols and xylenols and said novolak comprises 20–50% by weight of the bituminous mass-novolak mixture.

9. Process in accordance with claim 8 wherein, the novolak comprises 25–35% of the mixture.

10. Process in accordance with claim 1 wherein, a novolak having a softening point of 70–110° C., as measured by the method of Kramer-Sarnow, is used as the said novolak component.

11. Process in accordance with claim 1 and comprising the further step of subjecting the foamed material to a thermal treatment of 200–300° C. for at least one-half hour.

12. Process in accordance with claim 1 wherein, filling materials are incorporated in the said mixture.

13. Process in accordance with claim 1 wherein, a modifying agent selected from the group consisting of polyethylene, polystyrene and polyvinylchloride is incorporated in the said mixture.

14. Process in accordance with claim 1 wherein said treating step comprises pre-treating the said bituminous mass-novolak mixture before addition of hexamethylenetetramine thereto at a temperature in the range of 280–350° C. for at least one minute to initiate pre-condensation of the bituminous mass-novolak mixture.

15. Process in accordance with claim 14 wherein, the bituminous mass is selected from the group consisting of natural asphalt, petroleum bitumen, coal tar, lignite tar, wood tar, coal tar pitch, lignite tar pitch, wood tar pitch and petroleum bitumen rich in aromatic components.

16. Process in accordance with claim 14 wherein, the said foaming and hardening step is carried out at a temperature in the range of 170–190° C.

17. Process in accordance with claim 14 wherein, the bituminous mass comprises 50–80% by weight of the bituminous mass-novolak mixture, the bituminous mass is a pitch of 60–85° C. Kramer-Sarnow softening point, the novolak comprises 20–50% by weight of the mixture and is a 70–110° C. Kramer-Sarnow softening point derivative of a compound selected from the group consisting of phenol, cresols and xylenols.

18. Process in accordance with claim 14 and comprising the further step of subjecting the foamed material to a thermal treatment of 200–300° C. for at least one-half hour.

19. Process in accordance with claim 1 wherein, tar bases having a boiling range of 160–190° C. are added to the bituminous mass-novolak mixture before the addition of hexamethylenetetramine thereto.

20. Process in accordance with claim 19 wherein, the bituminous mass is selected from the group consisting of natural asphalt, petroleum bitumen, coal tar, lignite tar, wood tar, coal tar pitch, lignite tar pitch, wood tar pitch and petroleum bitumen rich in aromatic components.

21. Process in accordance with claim 19 wherein, the said foaming and hardening step is carried out at a temperature in the range of 170–190° C.

22. Process in accordance with claim 19 wherein, the bituminous mass comprises 50–80% by weight of the bituminous mass-novolak mixture, the bituminous mass is a pitch of 60–85° C. Kramer-Sarnow softening point, the novolak comprises 20–50% by weight of the mixture and is a 70–110° C. Kramer-Sarnow softening point derivative of a compound selected from the group consisting of phenol, cresols and xylenols.

23. Process in accordance with claim 19 and comprising the further step of subjecting the foamed material to a thermal treatment of 200–300° C. for at least one-half hour.

24. Process in accordance with claim 1 wherein, the mixture to be foamed and hardened is subjected to a pre-treatment step prior to said foaming step comprising the addition of 0.1–0.3 parts by weight of hexamethylenetetramine to 100 parts by weight of the bituminous mass, at a temperature of 150–160° C. for 15–30 minutes.

25. Process in accordance with claim 24 wherein, the bituminous mass is selected from the group consisting of natural asphalt, petroleum bitumen, coal tar, lignite tar, wood tar, coal tar pitch, lignite tar pitch, wood tar pitch and petroleum bitumen rich in aromatic components.

26. Process in accordance with claim 24 wherein, the said foaming and hardening step is carried out at a temperature in the range of 170–190° C.

27. Process in accordance with claim 24 wherein, the bituminous mass comprises 50–80% by weight of the bituminous mass-novolak mixture, the bituminous mass is a pitch of 60–85° C. Kramer-Sarnow softening point, the novolak comprises 20–50% by weight of the mixture and is a 70–100° C. Kramer-Sarnow softening point derivative of a compound selected from the group consisting of phenol, cresols and xylenols.

28. Process in accordance with claim 24 and comprising the further step of subjecting the foamed material to a thermal treatment of 200–300° C. for at least one-half hour.

References Cited

UNITED STATES PATENTS

| 3,207,687 | 9/1965 | Maier | 260—28 |
| 2,168,981 | 8/1939 | Flood et al. | 260—2.5 F |
| 3,717,602 | 2/1973 | Koch et al. | 260—28 |

FOREIGN PATENTS

| 891,021 | 7/1949 | Germany | 260—28 |

MURRAY TILLMAN, Primary Examiner

M. FOELAK, Assistant Examiner

U.S. Cl. X.R.

260—28, 847, 848